(12) United States Patent
Tehranipoor et al.

(10) Patent No.: US 11,222,098 B2
(45) Date of Patent: Jan. 11, 2022

(54) PROTECTING OBFUSCATED CIRCUITS AGAINST ATTACKS THAT UTILIZE TEST INFRASTRUCTURES

(71) Applicant: UNIVERSITY OF FLORIDA RESEARCH FOUNDATION, INCORPORATED, Gainesville, FL (US)

(72) Inventors: Mark M. Tehranipoor, Gainesville, FL (US); Domenic J. Forte, Gainesville, FL (US); Farimah Farahmandi, Gainesville, FL (US); Adib Nahiyan, Gainesville, FL (US); Fahim Rahman, Gainesville, FL (US); Mohammad Sazadur Rahman, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 203 days.

(21) Appl. No.: 16/535,795

(22) Filed: Aug. 8, 2019

(65) Prior Publication Data
US 2020/0065456 A1 Feb. 27, 2020

Related U.S. Application Data

(60) Provisional application No. 62/721,766, filed on Aug. 23, 2018.

(51) Int. Cl.
G06F 21/14 (2013.01)
G06F 12/14 (2006.01)
(Continued)

(52) U.S. Cl.
CPC .......... G06F 21/14 (2013.01); G06F 12/1408 (2013.01); G06F 21/72 (2013.01); H03K 19/17768 (2013.01)

(58) Field of Classification Search
CPC ...... G06F 21/14; G06F 21/72; G06F 12/1408; H03K 19/17768
See application file for complete search history.

(56) References Cited

U.S. PATENT DOCUMENTS

| | | | |
|---|---|---|---|
| 7,185,249 B2* | 2/2007 | Tkacik | G01R 31/31719 714/726 |
| 7,725,788 B2* | 5/2010 | Tkacik | G06F 21/75 714/726 |

(Continued)

*Primary Examiner* — Tongoc Tran
(74) *Attorney, Agent, or Firm* — Alston & Bird LLP (57) ABSTRACT

A dynamically obfuscated scan chain (DOSC) includes a control module designed to control memory loading, a linear feedback shift register (LFSR), a dynamic Obfuscation Key generator configured to use LFSR to generate a φ-bit protected Obfuscation Key, in order to confuse and change the test data into an output scan vectors when the Obfuscation Key update is triggered. The DOSC also includes a shadow chain, configured to input the φ-bit protected Obfuscation Key generated by the LFSR, and output $k\lfloor \varphi \times \alpha \rfloor$-bit protected Obfuscation Keys, and obfuscated scan chains. The DOSC operating method includes: loading control vectors to LFSR from control module during initialization; generating the Obfuscation Key at an output of the LFSR; generating the Obfuscation Key bit by bit based at least in part on the shadow chain and the Obfuscation Key during a first scan clock after reset in order to confuse test patterns.

20 Claims, 5 Drawing Sheets

Detailed architecture of the proposed DOSC (51) Int. Cl.
*G06F 21/72* (2013.01)
*H03K 19/17768* (2020.01)

(56) References Cited

U.S. PATENT DOCUMENTS

| | | | | |
|---|---|---|---|---|
| 7,987,331 | B2 * | 7/2011 | Borri | G01R 31/318544 |
| | | | | 711/166 |
| 9,927,490 | B2 * | 3/2018 | Hao | G01R 31/318536 |
| 2006/0020864 | A1 * | 1/2006 | Turner | G01R 31/318588 |
| | | | | 714/726 |
| 2006/0294312 | A1 * | 12/2006 | Walmsley | H04L 9/0662 |
| | | | | 711/122 |
| 2010/0333055 | A1 * | 12/2010 | Yu | G06F 11/267 |
| | | | | 716/108 |
| 2012/0062283 | A1 * | 3/2012 | Kwan | G01R 31/318575 |
| | | | | 327/143 |
| 2013/0254609 | A1 * | 9/2013 | Yonetoku | G01R 31/318552 |
| | | | | 714/729 |
| 2016/0091561 | A1 * | 3/2016 | Knight | G01R 31/31719 |
| | | | | 324/750.3 |
| 2017/0141930 | A1 * | 5/2017 | Rajski | G01R 31/318588 |
| 2018/0203065 | A1 * | 7/2018 | Dani | G01R 31/31725 |
| 2019/0007200 | A1 * | 1/2019 | Shah | H04L 9/0643 |

* cited by examiner

Figure 1. Hardware supply chain.

Figure 2. Overview of DOSC architecture

Figure 3. Detailed architecture of the proposed DOSC

Figure 4. The timing diagrams for DOSC architecture

Figure 5: The secure test methodology based on DOSC in the supply chain

PROTECTING OBFUSCATED CIRCUITS AGAINST ATTACKS THAT UTILIZE TEST INFRASTRUCTURES

CROSS-REFERENCE TO RELATED APPLICATIONS

This application claims the benefit of U.S. Provisional Patent Application Ser. No. 62/721,766, filed Aug. 23, 2018, which is incorporated herein by reference in its entirety, including any figures, tables, and drawings.

TECHNICAL FIELD

The present application relates to semiconductor hardware data security and privacy, and in particular, the protection of intellectual property (IP) data from a design house by using a logic obfuscation technique.

BACKGROUND

While the globalization of the semiconductor fabrication process has accelerated innovation, lowered costs and reduced time-to-market, it has also created non-trivial trust issues among the different entities involved in integrated circuit (IC) design and fabrication. For example, due to the prohibitive cost of building and maintaining a state-of-the-art semiconductor foundry and manufacturing, most design houses have transitioned to fabless model where untrusted, off-shore facilities are responsible for fabricating their products. As a result, they are now facing threats of IP theft/piracy, tampering, counterfeiting, and IC overproduction. From a global economy perspective, where IP protection laws (and the degree of their enforcement) vastly vary from one part to another, IP protection can no longer be limited to passive methods such as patents, copyrights, and watermarks that merely deter these threats. Therefore, there is a critical need to develop active approaches that prevent them altogether.

To address these concerns, researchers have proposed several techniques, e.g., IP encryption, logic locking, state space obfuscation, and IC camouflaging. The IEEE IP encryption standard (IEEE-P1735) was developed to protect the confidentiality of IPs and has been widely adopted by the semiconductor IP industry. However, limitations and vulnerabilities of these approaches have been highlighted recently. For example, weaknesses in the IEEE-P1735 standard has shown to be exploited to extract the entire RTL plaintext without the knowledge of the key. Even if the limitations of IEEE-P1735 standards are addressed, encrypting an RTL IP alone can never address supply chain issues like IC overproduction and tampering. Hence, logic locking/obfuscation has emerged as a possible solution for semiconductor IP protection.

Obfuscation techniques aim at locking and concealing to some extent the underlying IP such as cores, gate-level designs or layout, in order to prevent an adversary from reverse engineering and/or re-using the design. Basic logic locking works by embedding extra key-gates into the netlist of the circuit design. Proper operation of the circuit can only be ensured in the presence of the correct unlocking key. Although logic obfuscation can be an effective mechanism for establishing trust in the hardware design flow, it has not seen widespread application in semiconductor industry due to its lack of attack resiliency and formal notion of security. For example, a recent work has shown that most logic obfuscation techniques are vulnerable to Boolean satisfiability test (SAT) based attacks.

In order to mitigate SAT attacks, several SAT-resistant logic obfuscation techniques have been recently proposed. However, it has been demonstrated that all of these SAT-resistant logic locking techniques, SARLock and Anti-SAT to name a few, possess their own critical vulnerabilities. To be more specific, logic locking techniques that are highly resistant to SAT attacks have become more vulnerable to "bypass attacks" that can easily circumvent the effect of the SAT-resistant locking scheme.

Hence, there remains a need to develop SAT-resistant logic obfuscation techniques.

BRIEF SUMMARY

Embodiments of the subject invention provide a dynamically obfuscated scan chain (DOSC) structure, comprising: a feedback shift register (FSR); a control module configured to update the FSR; and a dynamic Obfuscation Key generator configured to generate an Obfuscation Key in response to the update.

Another embodiment discloses a method of a method of operating a DOSC structure, comprising: step 1, loading a control vector designed by a trusted entity as an input to an linear-feedback shift register (LFSR), step 2, generating dynamically the Obfuscation Key at an output of the LFSR, wherein the Obfuscation Key is protected by a shadow chain; step 3, generating scan cells based at least in part on the Obfuscation Key and shadow chain scan clock signals at a first scan clock signal after reset; and step 4, confusing test patterns and responses with the Obfuscation Key, wherein the Obfuscation Key is only know by the trusted entity.

DETAILED DESCRIPTION

Figure 1:
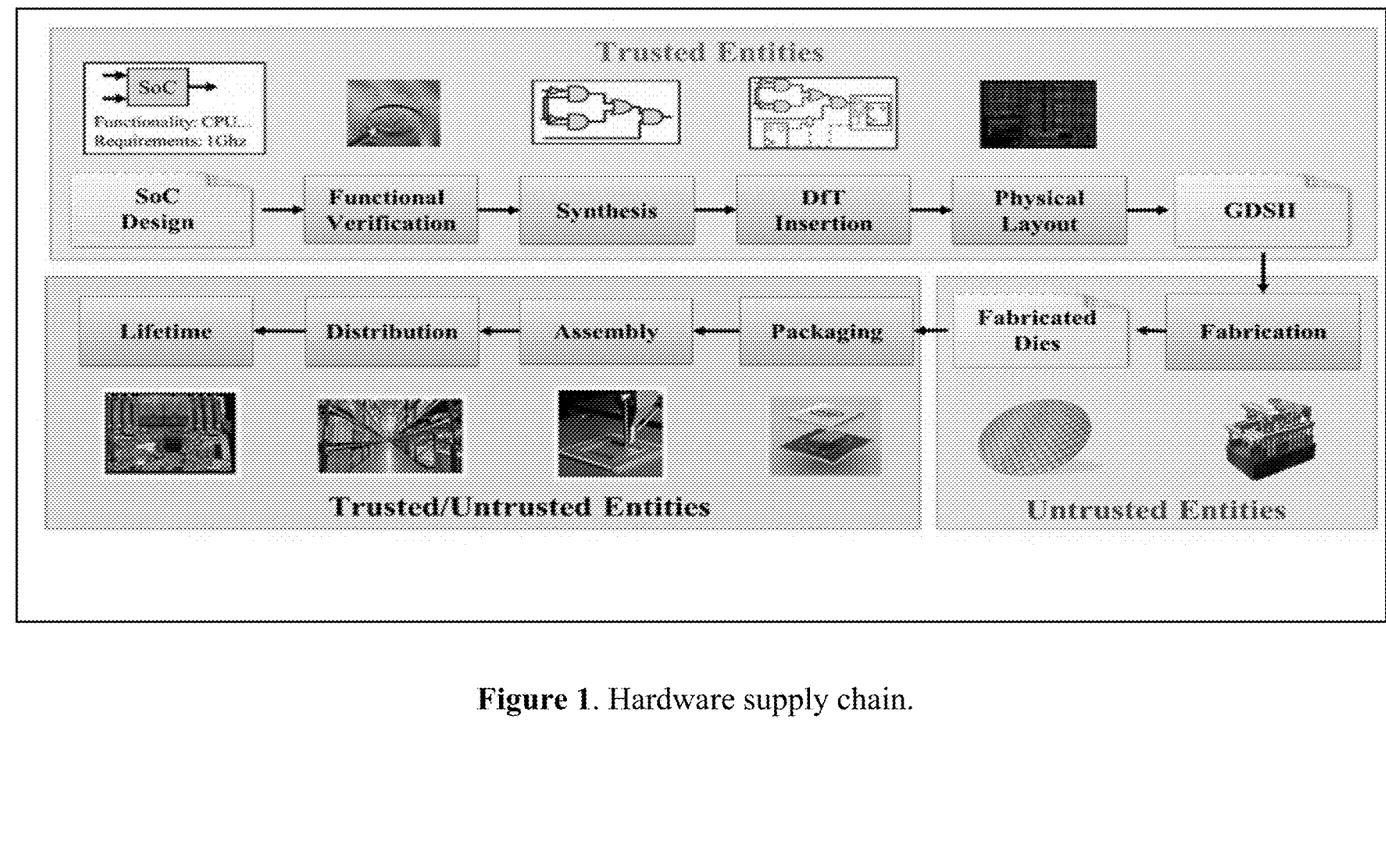
FIG. 1 shows a hardware supply chain in a basic system on chip (SoC) design and verification process, according to an embodiment of the subject invention.

FIG. 1 shows a hardware supply chain in a basic SoC design and verification process.

A SoC design and verification are assumed performed by a trusted entity shown in FIG. 1, e.g., the design house. The design house synthesizes the design based at least in part on a target technology library and integrates design-for-test (DFT) structures in order to improve testability. It then generates the physical layout and the Graphic Data System II (GDSII) version of the netlist and sends the GDSII file to an offshore IC foundry for mask fabrication. A foundry is assumed to be an untrusted entity that has access to the whole design data through the GDSII file. After the wafer fabrication, the silicon wafers go through wafer sort, packaging, testing and assembly, and then into distribution centers for product making. These remaining processes, e.g., packaging and testing, may be performed by untrusted entities such as foundries or assembly factories. However, in a tightly controlled supply chain such as the Department of Defense (DOD), these jobs would likely be done in trusted facilities. Although in a DOD threat model, wafers could be assumed to return to an onshore trusted facility for wafer sort, packaging, and test, and the chips remain in a trusted supply chain, here, a more difficult threat model is considered—the adversary (e.g., foundry and/or end user) not only has access to the design (acquired through the GDSII file), but possesses an unlocked, functional chip (acquired through rogue entities in supply chain).

Typically, a number of iterations of SAT attacks are set up to identify a correct key in an unlocked IC. In each SAT attack, one of a number of selected input patterns generated using the locked netlist are applied to the unlocked IC, and an output corresponding to the patterns are identified and collected from the IC. Such input patterns, often referred to as distinguishing input patterns (DIPs), can be recovered by any off-the-shelf SAT tools. Each iteration of the SAT attack uses one DIP to rule out keys until the correct key is found. It has been proven that SAT attacks are much faster than brute force because each iteration typically rules out a large number of incorrect keys.

In the SAT attack, it is assumed that an attacker has access to the following in order to break a combinational circuit's locking:

Locked Netlist: Such a netlist can be obtained from a malicious foundry or through reverse engineering; Unlocked IC: Such an IC can be obtained from the open market, through a malicious insider in the trusted supply chain, or taken off of the devices/systems left in the public or battlefield for military systems. This unlocked IC can be used by the attacker as an oracle, e.g., one can check whether the output for a given key from the locked netlist is correct;

Scan Chain: Most prior work only considers SAT attacks on combinational circuits for simplicity. However, extending the attack to sequential circuits requires an additional assumption that all flip-flops inside the circuits are accessible through a scan chain. Since a scan chain partitions the sequential circuits into smaller combinational circuits, the basic SAT attack needs to be run on each partition.

The efficiency of the complicated SAT attack can be expressed as follows.

$$T = \Sigma_{i=1}^{\sigma} t_i \qquad \text{Equ. (1)}$$

In equation (1), T is the total execution time for SAT attack; σ refers to the total number of SAT iterations required to find the correct key; and $t_i$ refers to the required time to solve the i-th SAT iteration. Parameter σ is dependent on the DIPs, length of key bits as well as locations of key gates in the obfuscated netlist. Parameter t_i depends on process of solving each SAT iteration. SAT attack can be thwarted if either G or t_i is large enough to make the SAT attack infeasible to perform within practical time and resources. Eliminating access to scan chain inside the chip by unauthorized users can achieve this goal.

However, existing scan-chain protection techniques have been primarily developed to protect scan infrastructure from scan-based attacks which aim to extract crypto keys exploiting the scan chain. Fundamental differences exist between the threat model for scan attacks and the threat model for attacks on logic locking. In scan attack, it is normally assumed that the attacker does not have detailed knowledge of the architecture of the scan chain. However, in the threat model for attacks on logic locking, the adversary has the detailed knowledge of the scan architecture since he/she has access to the locked netlist. Therefore, any protection mechanism incorporated in the scan architecture would also be visible to the attacker. Hence, none of the existing scan protection techniques can directly address logic locking attacks using scan.

Figure 2:
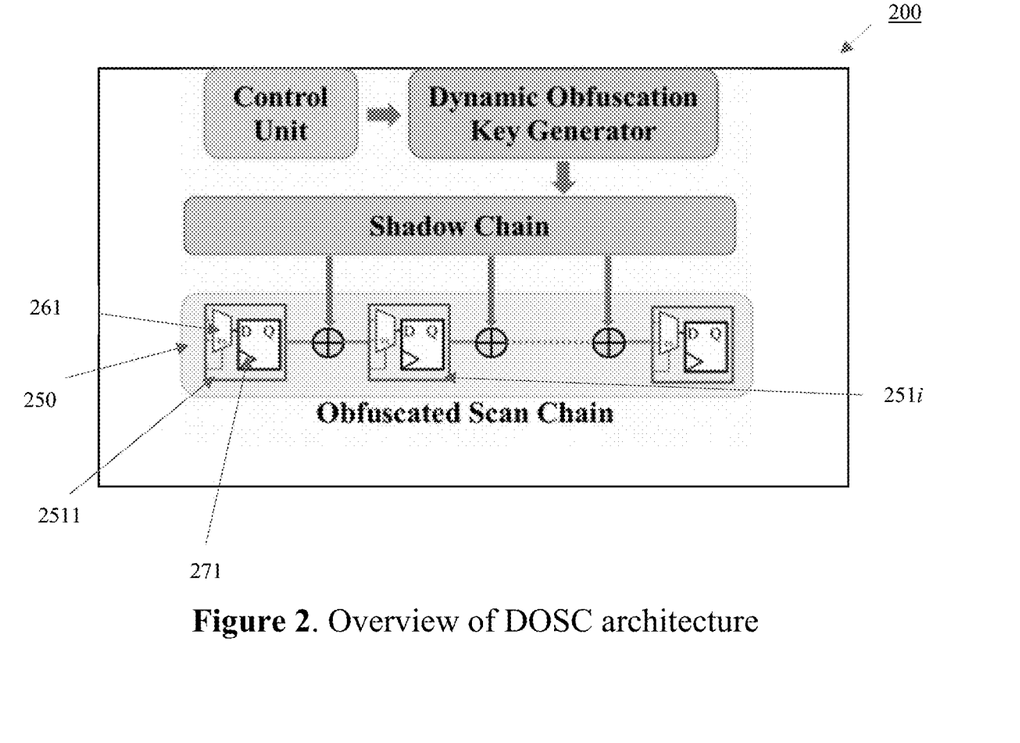
FIG. 2 shows a high-level overview of the DOSC architecture, according to an embodiment of the subject invention.

FIG. 2 shows a high-level overview of the DOSC architecture 200, according to an embodiment of the subject invention. Referring to FIG. 2, DOSC restricts access to the scan chain to all but the authorized users, e.g., design house or trusted packaging/test facility. There are four basic modules in FIG. 2: a Control Unit, a Dynamic Obfuscation Key Generator, a Shadow Chain and an Obfuscated Scan Chain 250. The control unit drives the Dynamic Obfuscation Key Generator with an LFSR and changes its output when the Obfuscation Key update is triggered. An Obfuscation Key output generated by the Dynamic Obfuscation Key Generator is protected through the shadow chain module. It should be noted that for the LFSR, a seed with all zeros is illegal when using an XOR feedback, because the all-zeros LFSR would keep XOR remain in a locked-up state and continues providing all-zero Obfuscation Keys. Therefore, the scan chains cannot be obfuscated. These four modules will be explained in detail in the following texts.

Control Unit: the Control Unit module is designed to control memory loading as well as LFSR activities.

Dynamic Obfuscation Key Generator: this module is constructed using an LFSR to generate an φ-bit Obfuscation Key (where φ is the length of the scan chain), which is used to scramble/confuse scan in/out vectors. In an industrial design with compression/decompression, the length of the scan chains is around 1000 scan flip-flops. The Obfuscation Keys are protected through the shadow chain module. The LFSR is driven by a control unit and changes its output when the Obfuscation Key update is triggered. It should be noted that for the LFSR, a seed with all zeros is illegal when using an XOR feedback, the LFSR would remain in a locked-up state and continues providing all-zero Obfuscation Key. Therefore, the scan chains cannot be obfuscated. To avoid the above scenario, it is suggested that some of XOR gates in LFSR should be replaced with XNOR gates.

Shadow Chain: The shadow chain's input is the φ-bit Obfuscation Key generated by the LFSR, while the outputs are k $\lfloor \varphi \times \alpha \rfloor$-bit protected Obfuscation Keys, where α is the permutation rate (the percentage of bits permuted inside each scan chain), and k is the number of scan chains. The shadow chain feeds the protected Obfuscation Keys to the obfuscated scan chain.

The Shadow Chain is designed for propagating the Obfuscation Key from the first scan cell 2511 to the i-th scan cell 251i along the scan chain when the i-th scan clock comes. Each scan cell includes a MUX 261 and a flip-flop 271. Therefore, the Shadow Chain is, among other things, able to:

1) protect the Obfuscation Key from being leaked through resetting attack,
2) prevent any unscrambled data from being scanned out,
3) prevent adversaries from scanning in values intentionally, and
4) at the same time, make no impact on structural and chain tests.

Figure 3:
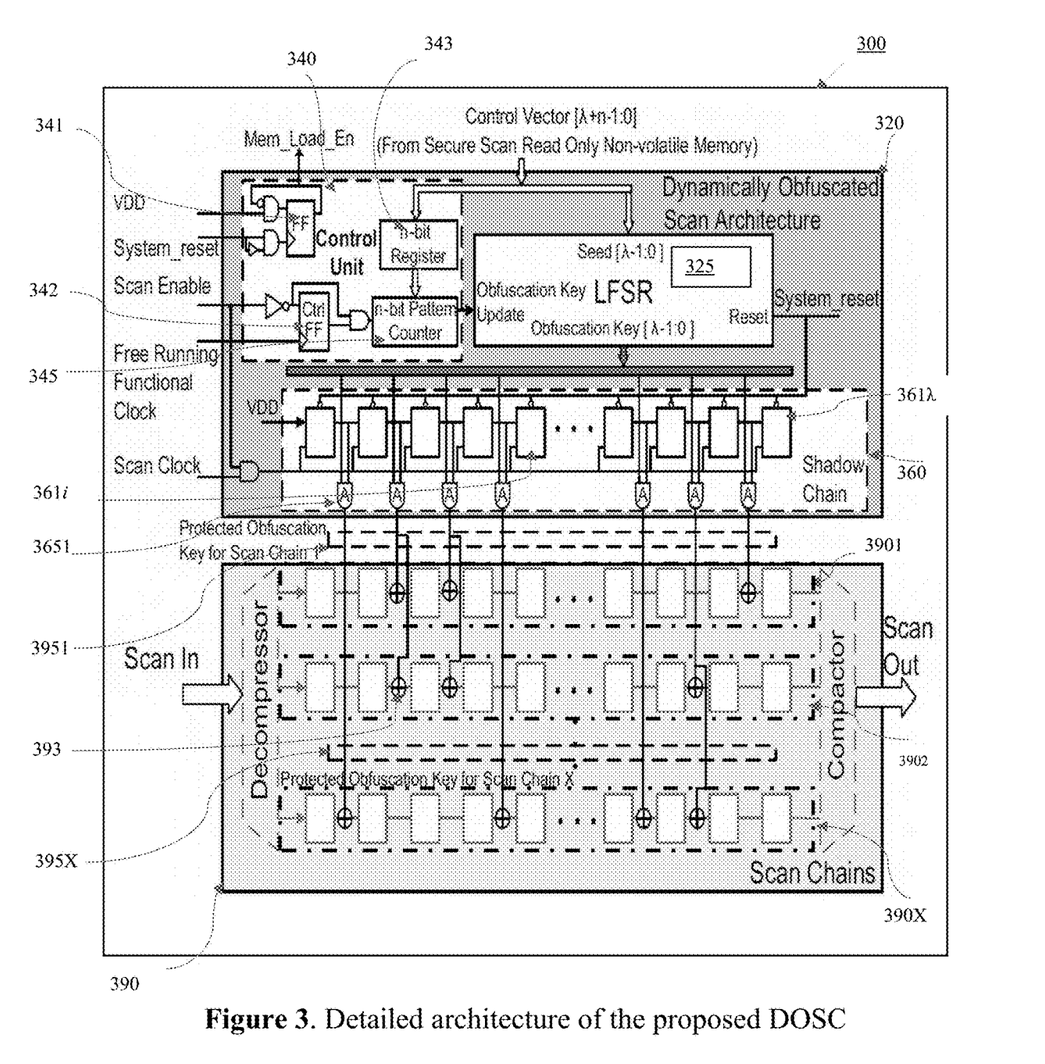
FIG. 3 shows a detailed DOSC architecture, according to an embodiment of the subject invention.

Each individual scan chain 250 is obfuscated as the result of the activities of the previous three modules. Referring to FIG. 3 which is the detailed DOSC architecture 300 of FIG. 2, it can be seen that the Shadow Chain 360 is designed as a cascade of λ flip-flops from 3611 to 361λ, driven by the scan clock gated by scan enable signals. As shown in FIG.

3, the data input of its first flip-flop 341 is connected to power voltage supply VDD. The XOR gate inserted after the i-th scan cell 361$i$ of Scan Chain X is controlled by the output of the i-th flip-flop of the Shadow Chain through an AND gate 365$i$. The AND gates 365$i$ of DOSC connect the scan cells within Shadow Chain. The Obfuscation Key bits generated by the LFSR 325 and the XOR gates after the Control flip-flop 342 inserted into the scan chain 390 are used to gate the individual Obfuscation Key bits by the scan cells of the Shadow Chain.

After reset, as the scan clock forces the flip-flop scan cells along the Shadow Chain 360 to logic '1' one by one, only when the last flip-flop cell in the Shadow Chain becomes logic '1' at the $\lambda$-th scan clock, the scrambled response starts to show up at the scan output. At the same time, the Shadow Chain's i-th flip-flop starts to obfuscate the i-th flip-flop of Scan Chain X at the i-th scan clock, which prevents the attacker from scanning in any intended values. Therefore, if the attacker keeps flushing the scan chain, an original or inverted scan in sequence shows up at the scan output after $\lambda$ bits of zeros.

The Shadow Chain 360 should be synchronously reset with the LFSR 325 at any reset event. As all the DFT scan chains are scanned synchronously, and the length of the scan chain is usually short with on-chip compression, the architecture only needs one single short Shadow Chain, which has low area penalty. Furthermore, as the Shadow Chain plugged into the scan chains 390 it cannot be bypassed.

Each individual scan chain 390 is obfuscated by placing a number of XOR gates 393 into random scan chain locations. The XOR gates are driven by the protected Obfuscation Keys generated by the shadow chain. The XOR 393 gates changes both the scan-in as well as the scan-out patterns and can only be interpreted by the entity which knows the protected Obfuscation Keys.

The detailed Control Unit 340 as shown in FIG. 3, is designed to control memory loading as well as LFSR 325 activities. It is composed of a small n-bit register 343, an n-bit pattern counter 345, as well as a control flip-flop 342. During system initialization, a Control Vector is loaded from the secure scan read-only non-volatile direct memory access (DMA), which includes a $\lambda$-bit seed for the LFSR 325, an n-bit value p determining the Obfuscation Key update frequency, and the maximum Obfuscation Key update count. The Control Unit 340 of the DOSC generates the Mem Load En signal. This signal allows the Control Vector of DOSC to be loaded from DMA once after system reset. The Control Vector is determined by the IC designer. As a part of system firmware, the Control Vector is stored into read only non-volatile memory located in secure zone with DMA, which satisfies:

1) immediate Control Vector accessing: the Control Vector is automatically loaded into DOSC at powering up, which can be guaranteed by hard coding the Control Vector address in DMA.

2) limited readability: the Control Vector can only be read by DOSC, which can be satisfied by using the handshaking Mem Load En signal (in FIG. 3) generated by DOSC, as an input of the DMA address accessing authorization. Additionally, as shown in FIG. 3, during scan, the Mem Load En signal also enables the Control Vector can only be read once after the reset event.

Note that DOSC is designed to protect the scan architecture but does not provide functional locking of the design. Therefore, DOSC needs to be augmented with a functional logic obfuscation technique. We expect that the DOSC architecture will make the functional logic obfuscation secure against SAT and other attacks. The detailed discussion of different attack analysis is presented later.

Based at least in part on the modules disclosed above, the obfuscation flow of the proposed design is summarized below.

Step 1, during system initialization, a control vector is loaded into the LFSR and the Control Unit, the control vector is composed of a seed for the LFSR and a vector to determine the Obfuscation Key update frequency.

Step 2, the Obfuscation Key is generated at the output of the LFSR, which is driven by the Control Unit.

Step 3, during the first $\lambda$ scan clocks after reset, the Protected Obfuscation Key is generated bit by bit based at least in part on the Shadow Chain and the Obfuscation Key.

Step 4, at the $\lambda$th scan clock, the Protected Obfuscation Key settles down. Then, all the test patterns and responses will be scrambled based at least in part on the Protected Obfuscation Key.

Figure 4:
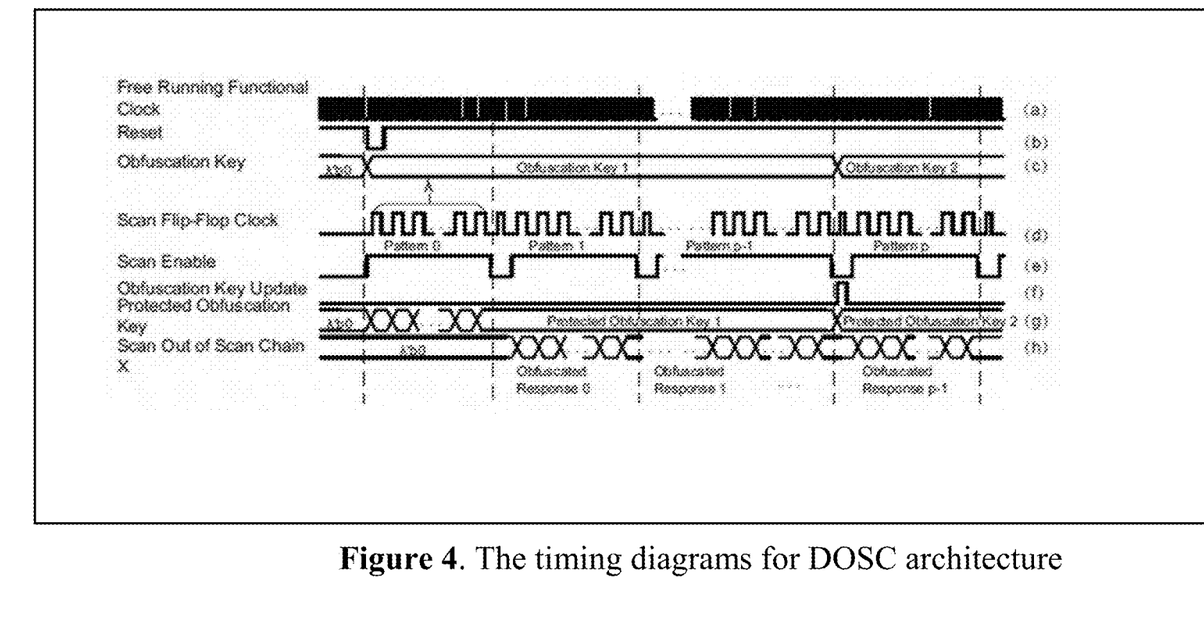
FIG. 4 shows the timing diagram of the proposed DOSC architecture, according to an embodiment of the subject invention.

FIG. 4 shows the timing diagram of the proposed DOSC architecture, according to an embodiment of the subject invention.

The Obfuscation Key is generated at the output of the LFSR in waveform (c)) and is dynamically changed every p patterns (p is configurable by the IP owner), when the Obfuscation Key update is enabled and generated by the Control Unit (waveforms (c) and (f)). As presented before, after reset, the Protected Obfuscation Key for Scan Chain X generated by the Shadow Chain is updated bit by bit with the scan clock and settles down at the $\lambda$-th scan clock (waveform (g)). During the period of the first $\lambda$ scan clocks, the scan out is locked to '0'. Once the $\lambda$-th scan clock comes, the scan out starts to output obfuscated responses (waveform (h)).

Figure 5:
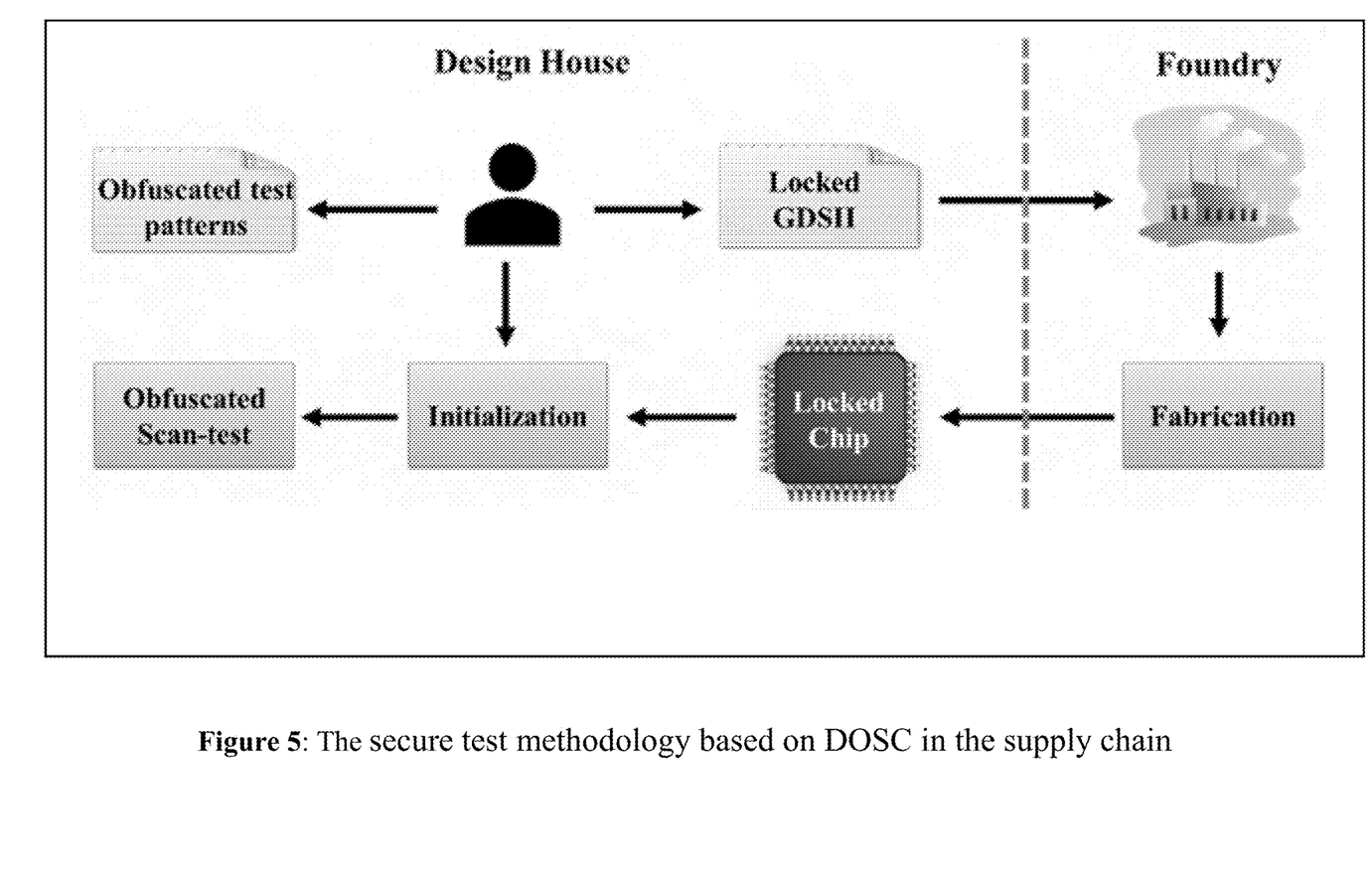
FIG. 5 shows a secure test methodology based at least in part on of the DOSC in a supply chain, according to an embodiment of the subject invention.

A secure test methodology used by supply chains based at least in part on the described DOSC is disclosed here. An overview of the proposed test methodology is shown in FIG. 5. Referring to FIG. 5, the design house (trusted entity) sends the functionally-locked and DOSC-incorporated GDSII file to the foundry. The foundry fabricates the chips and sends them back to the design house. Note that, the chips are functionally locked and can only be unlocked by the functional key which is only known by the design house.

There are three possible scenarios for this test methodology to be used.

First method, all testing, from wafer test, dicing, packaging, and post-packaging test are performed in a trusted facility, e.g., by the design house after the chips are sent back from the foundry. Therefore, the design house performs the 'Initialization' step where it stores the functional key, seed of LFSR and the permutation rate value in a secure non-volatile memory. The design house is the only entity with the knowledge of the seed of the LFSR and permutation rate a for each chip with its own unique ID (ECID). Therefore, the design house is the only entity that can derive the dynamic obfuscated key and interpret the correctly perturbed scan-in pattern and scan-out response. Hence, the design house can generate the obfuscated scan patterns to test the chip for stuck-at, transition, and/or delay faults. Functional test can be done anytime the logic Obfuscation Keys is in.

In the second method, the wafer Test is performed in an untrusted foundry. Afterwards, wafers are shipped to an on-shore facility, then dicing, packaging, and post-packaging test are performed in a trusted Facility: To lower the cost of overall tests, it is possible to allow the untrusted foundry to perform wafer test (also known as wafer sort) of the obfuscated chip incorporated with DOSC architecture. The design house could potentially provide the foundry with a dummy seed and a dummy functional key so that the die testing can be performed at the foundry. The foundry does not make any decision on what die is a "go" or "no go," instead ship the wafers along with the test responses to the trusted facility so they can make the final decision on each die with the test responses before dicing the wafer.

In the third method, test, dicing, and packaging are performed in an untrusted foundry: To lower the cost of test even further, it is possible to allow untrusted foundry and assembly factory to perform the testing of the obfuscated chip incorporated with DOSC architecture using dummy seed and dummy functional key so that the testing of die and packaged ICs can be performed at the foundry. This approach however could come with two potential security issues: (i) A foundry may try to perform the SAT attack by using the obfuscated scan-in and scan-out pattern provided by the design house and may hope to find at least a few key bits. However, finding a reasonable number of key bits will not be feasible using this approach as the foundry only has access to a few obfuscated scan-in and scan-out patterns whereas performing successful SAT attack usually requires many more patterns; (ii) A foundry could interpret which chips passed the yield testing by analyzing the obfuscated scan-in and scan-out patterns. In many applications, the design house may not want the foundry to figure out the testing results. (iii) Since foundry and assembly factory must know which die was a "go" prior to dicing, then the foundry could remove the DOSC and functional locking architectures after learning the good input pattern/output response set.

The issue related to the third method applies to all obfuscation techniques. Hence, a more elaborate technique such as "Secure Split Test which requires an on-chip PKI infrastructure" could be used to ensure that foundry and assembly factory would not be able to reverse engineer, over produce, etc. of the chips, therefore the untrusted facilities are enabled to perform the entire test and fabrication process.

The proposed DOSC architecture is secured against various attacks, as described in the following.

DOSC is resilient against SAT attack. The DOSC architecture restricts access to scan-chain by obfuscating both the scan-in vectors and scan-out responses. To perform SAT attack, one needs to scan-in a specific pattern generated by the SAT solver and scan-out the response. The obfuscated scan-in and scan-out capability prevents the attacker from controlling the scan-in patterns as well as observing the scan-out patterns in the unlocked IC. Moreover, the Obfuscation Key is updated with a permutation rate of a which further prevents the SAT attacker from retrieving the key. Also, the design house can change the permutation rate a from chip to chip resulting in different scan-in and scan-out pattern for different chips.

DOSC is also resilient against brute force Obfuscation Key attacks. If the adversary wants to use brute force to guess the correct protected Obfuscation Key, the overall probability of guessing the correct one is computationally prohibitive. The probability of guessing the correct key is shown below in Equation 2:

$$\text{Probability} = 1/(_{(\varphi \times \alpha)}C_{(\varphi+1)} \times 2^{([\varphi \times \alpha]-1)}) \qquad \text{Equ. (2)}$$

In equation (2), expression $(_{(\varphi \times \alpha)}C_{(\varphi+1)})$ represents the overall combinations selecting correct key positions ($\varphi \times \alpha$), and $2^{([\varphi \times \alpha]-1)}$ is the number of possible keys. For a chain length of $\varphi=128$ and permutation rate of $\alpha=30\%$, the probability of guessing the correct key is $1=1/2^296$ which is not practical.

DOSC is resilient against bypass attacks. This attack first identifies the DIPs that cause an incorrect output for a wrong key known, then stitches a "bypass circuit" to monitor those DIPs and reverses the output back to the correct one. Similar to the SAT attack, the bypass attack also requires access to scan-chain to observe the correct output value of the unlocked chip. However, the DOSC architecture restricts an adversary to observe the scan-out responses and thereby, prevents bypass attack.

DOSC is resilient against scan-based attacks. The disclosed DOSC architecture can effectively defend against scan-based attacks, e.g., differential attacks, test mode only differential attacks, resetting attacks, and, flushing attacks. These attacks rely on scanning out the intermediate functional data which contains sensitive information about assets, e.g., encryption key. However, the existence of the Shadow Chain in the DOSC architecture prevents the adversary from flushing out any un-obfuscated intermediate functional data and thereby, counter these attacks.

DOSC is also resilient against key sensitization attacks. An adversary that has access to the netlist may try to sensitize the Obfuscation Keys using the ATPG technique. The scan-chain is obfuscated with XOR logic (as shown in FIG. 3) and the adversary does not have the knowledge which XOR gates will be transparent or not in the unlocked chip. The complexity of finding this is the same as the complexity of the brute force attack. Therefore, the DOSC architecture can effectively defend against key sensitization attack.

DOSC is resilient against removal attacks as well. A rogue foundry can try to remove the DOSC system from the design and produce chips without the secure scan. However, these chips are still functionally locked and useless without the functional key. The foundry may try to retrieve an unlocked chip from the supply chain and perform SAT attack to retrieve the functional key. However, the scan responses of an unlocked chip are obfuscated by the DOSC architecture and are not vulnerable to SAT attack. Therefore, the foundry cannot retrieve the functional key by removing the DOSC module which eliminates the possibility of removal attack.

It should be understood that the examples and embodiments described herein are for illustrative purposes only and that various modifications or changes in light thereof will be suggested to persons skilled in the art and are to be included within the spirit and purview of this application.

The invention claimed is:

1. A dynamically obfuscated scan chain (DOSC) structure, comprising:
    a feedback shift register (FSR);
    a control module configured to update the FSR;
    a dynamic Obfuscation Key generator configured to generate an Obfuscation Key in response to the update; and
    a shadow chain module comprising a plurality of scan cells and configured to generate an output for each of a plurality of obfuscated scan chains based at least in part on the Obfuscation Key, wherein the plurality of obfuscated scan chains comprises XOR gates placed randomly into the plurality of scan cells, the XOR gates being driven by a plurality of protected Obfuscation Keys output from the shadow chain module, and wherein the shadow chain module generates and provides the plurality of protected Obfuscation Keys to an i-th scan cell along the obfuscated scan chains when an i-th clock signal comes.

2. The DOSC structure of claim 1, wherein a linear feedback shift register (LFSR) comprises an XNOR gate, and wherein at least one of the φ-bit Obfuscation Keys is a non-zero-bit Obfuscation Key.

3. The DOSC structure of claim 1, wherein the shadow chain module further comprises a cascade of λ flip-flops, each flip-flop driven by a scan clock gated by scan enable signals, and wherein a data input of a first flip-flop is connected to a power input signal (represented as VDD).

4. The DOSC structure of claim 1, wherein the shadow chain module further comprises an XNOR gate inserted after an i-th scan cell of the shadow chain module, the XNOR gate controlled by the output of an i-th flip-flop of the shadow chain module through an AND gate, and wherein the AND gate connects the scan cells within the shadow chain module.

5. The DOSC structure of claim 2, wherein a length of an obfuscated scan chain is about 1000 flip-flops.

6. The DOSC structure of claim 2, wherein a control vector is loaded into the LFSR and the control module, wherein the XOR gates change both the control vector and an output scan vector, and wherein the plurality of protected Obfuscation Keys is only known by an entity that designs the control vector.

7. The DOSC structure of claim 2, wherein the control module further comprises an n-bit register, an n-bit pattern counter, and a non-volatile direct memory access (DMA), wherein the DMA comprises an n-bit seed for the LFSR, an n-bit value determining an Obfuscation Key update frequency, and a maximum Obfuscation Key update count.

8. The DOSC structure of claim 6, wherein the entity is a design house.

9. The DOSC structure of claim 6, wherein the control vector is determined by the design house.

10. The DOSC structure of claim 7, wherein a control vector is stored into a non-volatile memory located in a secure zone with DMA and is automatically loaded into the DOSC structure at powering up.

11. A method of operating a dynamically obfuscated scan chain (DOSC) structure, comprising:
loading a control vector designed by a trusted entity as an input to a linear feedback shift register (LFSR), wherein the LFSR is driven by a control module during initialization, wherein the control module comprises a seed for the LFSR, and wherein a control vector is used to determine an update frequency of an Obfuscation Key;
generating dynamically the Obfuscation Key at an output of the LFSR, wherein the Obfuscation Key is provided to a shadow chain comprising a plurality of scan cells and configured to output a plurality of protected Obfuscation Keys each corresponding to one of a plurality of obfuscated scan chains;
generating scan cells for each of a plurality of obfuscated scan chains based at least in part on a corresponding protected Obfuscation Key and shadow chain scan clock signals at a first scan clock signal after reset, wherein the plurality of obfuscated scan chains comprises XOR gates placed randomly into the plurality of scan cells, the XOR gates being driven by the plurality of protected Obfuscation Keys output from the shadow chain, and wherein the shadow chain module generates and provides the plurality of protected Obfuscation Keys to an i-th scan cell along the obfuscated scan chains when an i-th clock signal comes; and
confusing test patterns and responses with the Obfuscation Key, wherein the Obfuscation Key is only known by the trusted entity.

12. The method of operating a DOSC structure of claim 11, wherein the Obfuscation Key is dynamically configurable by the trusted entity, when an Obfuscation Key update is enabled and generated by the control module.

13. The method of operating a DOSC structure of claim 11, wherein the trusted entity is a design house owning IP data.

14. The method of operating a DOSC structure of claim 11, wherein the Obfuscation Key is updated bit by bit with a scan clock and settles down after clock reset.

15. The method of operating a DOSC structure of claim 11, wherein in a period of the first scan clock signal, a scan output is locked to '0,' and wherein after the scan clock signal comes, the scan output starts to output obfuscated responses.

16. A method of performing a secure test using the DOSC of claim 1, comprising:
a trusted entity sending a secured file on how to manufacture a semiconductor chip to an untrusted entity, wherein the untrusted entity fabricates the semiconductor chip and sends it back to the trusted entity,
wherein the semiconductor chip is functionally locked and can only be unlocked by a functional key known only by the trusted entity, and
wherein the secured file is a functionally-locked DOSC-incorporated GDSII.

17. The method of performing a secure test using the DOSC of claim 16, wherein the trusted entity is a design house and the untrusted entity is a factory.

18. The method of performing a secure test using the DOSC of claim 16, further comprising performing wafer test, dicing, packaging, and post-packaging test by the trusted entity.

19. The method of performing a secure test using the DOSC of claim 16, further comprising performing wafer test in the untrusted entity, shipping the semiconductor chip to the trusted entity, and performing dicing, packaging, and post-packaging test in the trusted entity, wherein the trusted entity provides the untrusted entity with a dummy seed and a dummy functional key; and wherein the untrusted entity does not make any decision on what die is a "go" or "no go," and the trusted entity makes a final decision on "go" or "no go".

20. The method of performing a secure test using the DOSC of claim 16, further comprising performing wafer test, dicing, and packaging in the untrusted entity, wherein the DOSC architecture using dummy seed and dummy functional key is provided in the wafer test, wherein the untrusted entity can analyze the obfuscated key and remove the DOSC and functional locking after learning about a die is good.

* * * * *